(12) United States Patent
Iancu et al.

(10) Patent No.: US 7,573,965 B2
(45) Date of Patent: Aug. 11, 2009

(54) KALMAN FILTER FOR CHANNEL ESTIMATION IN OFDM SYSTEMS

(75) Inventors: Daniel Iancu, Pleasantville, NY (US); Hua Ye, Durham, NC (US); John Glossner, Carmel, NY (US)

(73) Assignee: Sandbridge Technologies Inc., White Plains, NY (US)

( * ) Notice: Subject to any disclaimer, the term of this patent is extended or adjusted under 35 U.S.C. 154(b) by 651 days.

(21) Appl. No.: 11/298,684

(22) Filed: Dec. 12, 2005

(65) Prior Publication Data

US 2007/0133696 A1 Jun. 14, 2007

(51) Int. Cl.
*H04B 1/10* (2006.01)
(52) U.S. Cl. ...................................... 375/350; 375/260
(58) Field of Classification Search ................. 375/260, 375/299, 350
See application file for complete search history.

(56) References Cited

U.S. PATENT DOCUMENTS

| | | | |
|---|---|---|---|
| 5,467,132 A | 11/1995 | Fazel et al. | |
| 6,240,146 B1 | 5/2001 | Stott et al. | |
| 6,295,326 B1 | 9/2001 | Tonissen et al. | |
| 6,317,470 B1 | 11/2001 | Kroeger et al. | |
| 6,320,917 B1 | 11/2001 | Stott et al. | |
| 6,359,938 B1 | 3/2002 | Keevill et al. | |
| 6,687,315 B2 | 2/2004 | Keevill et al. | |
| 7,379,513 B2* | 5/2008 | Wang et al. | 375/340 |
| 2003/0227887 A1 | 12/2003 | Abrishamakar et al. | |
| 2005/0069054 A1 | 3/2005 | Zhidkov | |
| 2005/0084023 A1 | 4/2005 | Bott et al. | |
| 2006/0072692 A1* | 4/2006 | Gifford et al. | 375/350 |

OTHER PUBLICATIONS

He, J. "Interference Suppression and Parameter Estimation in Wireless communication Systems over Time-Varying Multi Path Channels." A dessertation submitted to the graduate facult to Louisiana State Univerisity, May 2005, pp. 1-54.*

* cited by examiner

*Primary Examiner*—Shuwang Liu
*Assistant Examiner*—David Huang
(74) *Attorney, Agent, or Firm*—Barnes & Thornburg LLP

(57) ABSTRACT

A scalar Kalman filter is applied for a Least-Square estimated value $H_s$ at s. The filter has an input for receiving $H_s$, a filter equation and an out for the corrected estimated value $H_s^k$ for the $k^{th}$ variable. The filter equation is $H_s^k = K_{gain} S_n[k]$ wherein: correction $S_n[k] = S + K_n(H_s - S)$; prediction of the correction $S = K_a S_n[k]$; Kalman filter gain $K_n = P/(1+P)$; minimum predication MSE $P = K_a^2 P_n[k] + K_b$; minimum MSE $P_n[k] = P(1 - K_n)$; and $K_a$, $K_{gain}$ and $K_b$ are constants.

10 Claims, 1 Drawing Sheet

- boosted pilot
- data

KALMAN FILTER FOR CHANNEL ESTIMATION IN OFDM SYSTEMS

BACKGROUND AND SUMMARY OF THE DISCLOSURE

The general field is a Kalman filter and more specifically an application of Kalman filtering algorithm in an OFDM based communication system.

Orthogonal Frequency Division Multiplexing OFDM has been widely applied in wireless communication systems such as DVB-T/H, 802.11x wireless LAN and 802.16 wireless MAN due to its high bandwidth efficiency and robustness to multipath fading. Due to the fact that the wideband wireless channel is frequency selective and time varying, channel estimation must be performed continuously and the received OFDM subcarriers must be corrected by the estimated CTFs. FIG. 1 shows a generic OFDM receiver.

In DVB systems, channel estimation is performed by inserting known scattered pilots at predefined subcarrier locations in each OFDM symbol (see ETSI EN 300 744 V.1.4.1 "Digital Video Broadcasting (DVB): Framing Structures, channel coding, and modulation for digital terrestrial television"), normally referred to as "comb-type" pilot channel estimation.

FIG. 2 shows the scattered pilots insertion in DVB-T transmitters. The PPS pilots and the continual pilots are not shown for sake of clarity. The comb-type channel estimation consists of algorithms to first estimate the channel transfer functions at the pilot locations and then to interpolate the channel transfer function in time and frequency domain to get the channel estimates for all the OFDM subcarrier locations.

As shown in FIG. 2, in comb-type pilot based channel estimation the $N_s$ scattered pilots are inserted uniformly into the OFDM spectrum according to the following rules:

For the symbol of index l (ranging from 0 to 67), carriers for which index k belongs to the subset $\{k=K_{min}+3\times(l \bmod 4)+12p|p=int, p \geq 0, k \in [K_{min}; K_{max}]\}$ are scattered pilots.

Where p is an integer that takes all possible values greater than or equal to zero, provided that the resulting value for k does not exceed the valid range $[K_{min}; K_{max}]$.

Assume that for current symbol of index l, the $N_s$ inserted scattered pilots according to the above rule are: $X_s$, s=0, 1, ... $N_s$-1, the corresponding received subcarriers at the scattered pilot locations are: $Y_s$, s=0, 1, ... $N_s$-1, the channel frequency response at the pilot subcarrier locations can be represented as: $H_s$, s=0, 1, ... $N_s$-1, then the Least-Square estimate of the channel frequency response at the pilot subcarrier locations is given by:

$$\hat{H}_s = \frac{Y_s}{X_s}, s = 0, 1, \ldots N_s - 1$$

The above LS estimation is sensitive to noise and ICI, MMSE estimation is known to provide better performance than LS estimation. However, MMSE estimation requires matrix inversion at each iteration, thus not practical for implementation.

In this disclosure, a simplified Kalman filter is provided which reduces the noise effects of the LS estimation. Simulation shows that the simplified Kalman filter is very effective in removing the noise effects, and the overall system performance will be improved by up to 2 dB.

A scalar Kalman filter is applied for a Least-Square estimated value $H_s$ at s. The filter has an input for receiving $H_s$, a filter equation and an output for the corrected estimated value $H_s^k$ for the $k^{th}$ variable. The filter equation is $H_s^k = K_{gain} S_n[k]$ wherein: correction $S_n[k] = S + K_n(H_s - S)$; prediction of the correction $S = K_a S_n[k]$; Kalman filter gain $K_n = P/(1+P)$; minimum predication MSE $P = K_a^2 P_n[k] + K_b$; minimum MSE $P_n[k] = P(1-K_n)$; and $K_a$, $K_{gain}$ and $K_b$ are constants.

A receiver includes an OFDM demodulator, a channel corrector and a channel estimator; and wherein the channel estimator is a Least-Square estimator of a channel frequency response $H_s$ of a subcarrier k. The channel estimator includes the simplified Kalman filter. The constants $K_{gain}$, $K_a$ and $K_b$ may be selected as a function of the modulation mode of the subcarrier. The channel estimator processes scattered pilots whose locations s repeats its pattern every r symbols; and the channel estimator includes $r*N_s$ Kalman filters.

The filter gain $K_n$ may also be a constant selected as a function of the modulation mode of the subcarrier. The filter equation is performed in software.

These and other aspects of the present disclosure will become apparent from the following detailed description of the disclosure, when considered in conjunction with accompanying drawings.

DETAILED DESCRIPTION OF THE PREFERRED EMBODIMENTS

Figure 1:
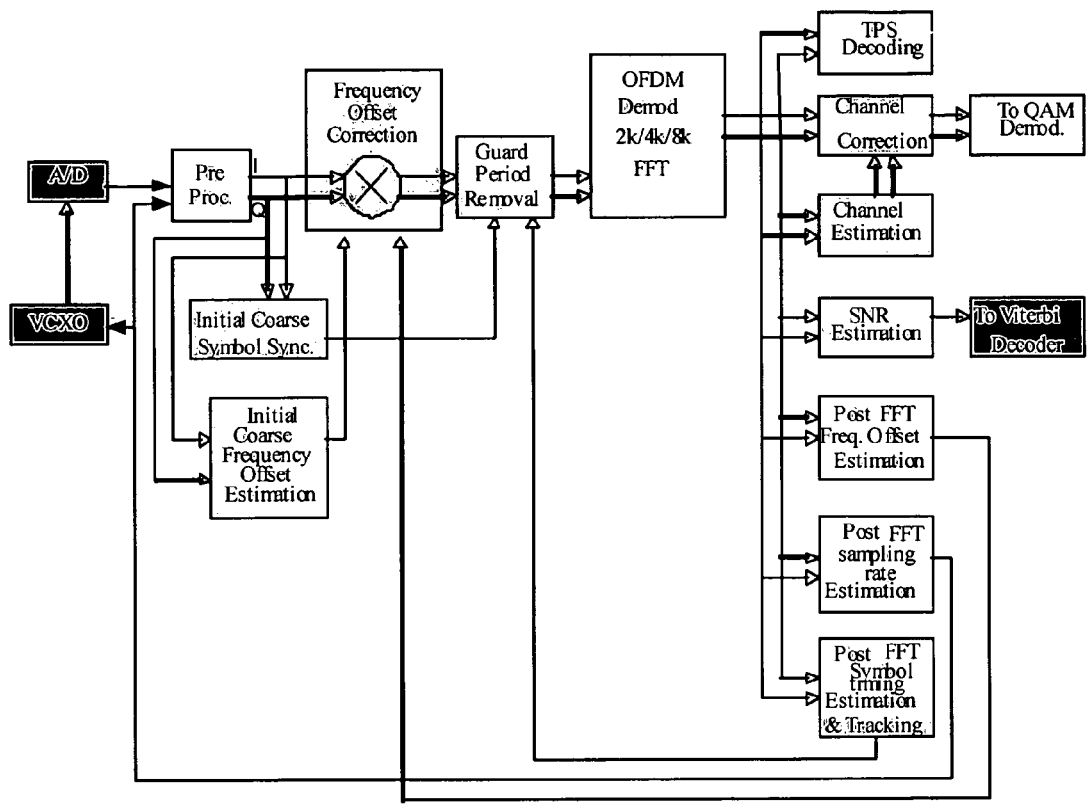
FIG. 1 is a block diagram of an Orthogonal Frequency Division Multiplexing (OFDM) receiver, according to the prior art.
Figure 2:
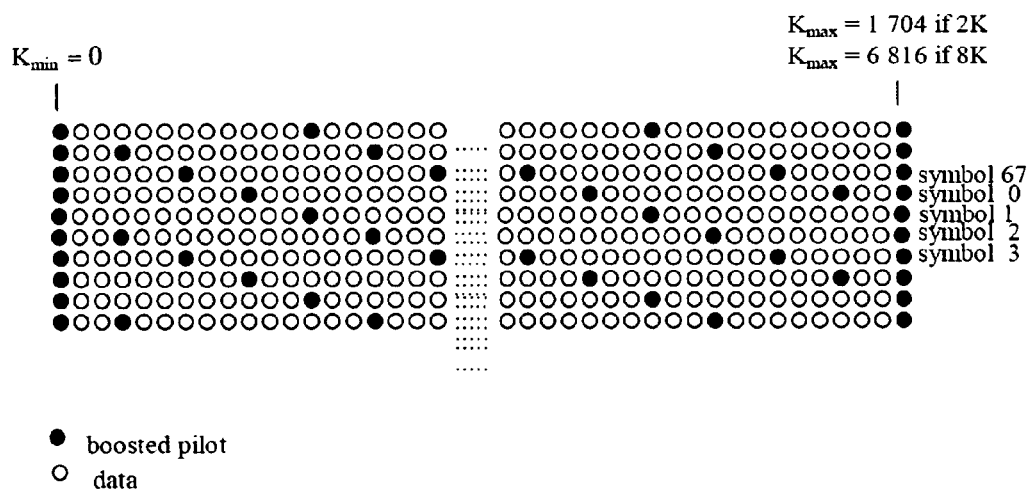
FIG. 2 is a diagram of scattered pilot plots insertion locations in DVB-T transmitters.

In the proposed channel estimation algorithm, for the current OFDM symbol of index l (ranging from 0 to 67), the Least-Square estimate of the channel frequency response at the pilot subcarrier locations $$\hat{H}_s = \frac{Y_s}{X_s}, s = 0, 1, \ldots N, -1$$

can be further processed by individual Kalman smoothing filters to reduce the noise and ICI effects before the LS estimate is used in time/frequency domain interpolation.

Since the scattered pilot location repeats its pattern every $4^{th}$ symbol, there will be a total of $(N_{s,l \bmod 4} + N_{s,(l+1) \bmod 4} + N_{s,(l+2) \bmod 4} + N_{s,(l+3) \bmod 4})$ individual Kalman filters. If a different repeat pattern is used, the number of Kalman filters would match the repeat pattern.

The general form of a scalar Kalman filter is described in the following equations (see "Fundamentals of Statistical Signal Processing Estimation Theory," Steven M. Kay, PTR Prentice-Hall, Inc., 1993).

Prediction: First order Markov process: $\hat{s}[n|n-1] = a\hat{s}[n-1|n-1]$

Minimum prediction MSE: $P[n|n-1] = a^2 P[n-1|n-1] + \sigma_u^2$

Kalman Gain:

$$K[n] = \frac{P[n|n-1]}{\sigma_n^2 + P[n|n-1]}$$

Correction: $\hat{s}[n|n] = \hat{s}[n|n-1] + K[n](x[n] - \hat{s}[n|n-1])$ Where $x[n]$ is the input data at the $n^{th}$ iteration Minimum MSE: $P[n|n] = (1-K[n])P[n|n-1]$ The simplifying assumptions of the present design are:

all the scattered pilots are supposed to be uncorrelated, characterized by the first order Markov process;

the measurement noise variance $\sigma_n^2$ is supposed to be the same for all carriers;

the signal noise variance $\sigma_u^2$ is supposed to be the same for all carriers; and from the previous assumptions since the Kalman gain converges to a constant after a few iterations, it will be assumed to be a constant.

Based on the simplifying assumptions, every pilot carrier will be filtered independently by a scalar Kalman filter. The scalar Kalman filter equations, for the $k^{th}$ Kalman filter, corresponding to the scattered pilot located at the $k^{th}$ subcarrier, become:

$$S = K_a S_n[k]$$

$$P = K_a^2 P_n[k] + K_b$$

$$K_n = \frac{P}{1+P}$$

$$S_n[k] = S + K_n(\hat{H}_s - S)$$

$$P_n[k] = P(1 - K_n)$$

$$H_s^k = K_{gain} S_n[k]$$

Where the filtering will take place on symbol bases.

$$\{k = K_{min} + 3 \times (l \bmod 4) + 12p | p = \text{int}, p \geq 0, k \in [K_{min}, K_{max}]\}.$$

$\hat{H}_s$ is the LS estimate on the scattered pilot location s, and $H_s^k$ is the Kalman filter smoothed output of $\hat{H}_s$.

In the above equations, $K_a$, $K_b$, and $K_{gain}$ are constants and the calculation of Kalman gain factor $K_n$ requires divisions. It is found that $K_n$ will converge to its steady state value over a few OFDM symbols. In order to simplify the implementation, $K_n$ is also set as a constant. The above constants can be set by evaluating the performance in various multipath fading channels and noise conditions. It has also been found that one may set the Kalman constants differently for different modulation modes, such as QPSK, 16 QAM and 64 QAM to achieve better smoothing performance. In a preferred embodiment, the Kalman filter constants are set according to the modulation mode whenever a valid tps frame is decoded.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed is:

1. A receiver, comprising:
   an OFDM demodulator;
   a channel corrector connected downstream of the OFDM demodulator; and
   a channel estimator connected downstream in the OFDM demodulator and to the channel corrector to generate output to the channel corrector;
   wherein the channel estimator comprises a scalar Kalman filter that determines a Least-Square estimated value, $H_s$, at pilot subcarrier locations, s, according to a filter equation $$H_s^k = K_{gain} S_n[k],$$

wherein $H_s$, is received by the filter equation as an input, wherein a value of $H_s^k$ is processed for each $k^{th}$ variable, wherein the filter equation processes a correction value, $S_n[k]$, according to a first equation $$S_n[k] = S + K_n(H_s - S),$$

wherein the equation filter processes a prediction for the correction value, S, according to a second equation $$S = K_a S_n[k],$$

wherein filter equation processes a gain, $K_n$, according to a third equation $$K_n = P/(1+P),$$

wherein the filter equation processes a minimum MSE according to a fourth equation $$P_n[k] = P(1 - K_n),$$

wherein the filter equation processes a prediction for a minimum MSE according to a fifth equation $$P = K_a^2 P_n[k] + K_b, \text{ and}$$

wherein $K_a$, $K_b$ and $K_{gain}$ are constants.

2. A receiver according to claim 1, wherein $K_n$ is a constant.

3. A receiver according to claim 1, wherein the constants $K_n$, $K_a$, $K_{gain}$ and $K_b$ are selected as a function of the modulation mode of the subcarrier.

4. A receiver according to claim 1, wherein the channel estimator processes scattered pilots whose locations s repeats its pattern every r symbols; and the channel estimator includes $r*N_s$ Kalman filters.

5. A receiver according to claim 1, wherein the filter equation is performed in software.

6. A scalar filter process executed by a receiver, comprising:
   demodulating an input signal by an OFDM demodulator to produce a demodulated signal;
   producing a channel corrected signal from the demodulated signal by a channel corrector connected downstream of the OFDM demodulator;
   generating an output from a channel estimator connected downstream of the OFDM demodulator and connected to the channel corrector; and
   supplying the output to the channel corrector;
   wherein the channel estimator incorporates a computer readable medium encoded with a computer program for processing a scalar Kalman filter that determines a Least-Square estimated value, $H_s$, at pilot subcarrier locations, s, according to a filter equation $$H_s^k = K_{gain} S_n[k],$$

receiving $H_s$ by the filter equation as an input,
   processing a value of $H_s^k$ for each $k^{th}$ variable,
   processing a correction value, $S_n[k]$, according to a first equation $$S_n[k] = S + K_n(H_s - S),$$

processing a prediction for the correction value, S, according to a second equation $$S = K_a S_n[k],$$

processing a gain, $K_n$, according to a third equation $$K_n = P/(1+P),$$

processing a minimum MSE according to a fourth equation $$P_n[k] = P(1 - K_n), \text{ and}$$

processing a prediction for a minimum MSE according to a fifth equation $$P = K_a^2 P_n[k] + K_b,$$

wherein $K_a$, $K_b$ and $K_{gain}$ are constants.

7. A scalar filter process according to claim 6, wherein $K_n$ is a constant.

8. A scalar filter process according to claim 6, wherein the constants $K_n, K_a, K_{gain}$ and $K_b$ are selected as a function of the modulation mode of the subcarrier.

9. A scalar filter process according to claim 6, wherein the channel estimator processes scattered pilots whose locations s repeats its pattern every r symbols; and wherein the channel estimator includes $r*N_s$ Kalman filters.

10. A scalar filter process according to claim 6, wherein the filter equation is performed in software.

* * * * *